May 14, 1957
R. E. BOSS
2,792,073
AIR FILTER AND OILER FOR PNEUMATIC TOOLS
Filed April 19, 1955
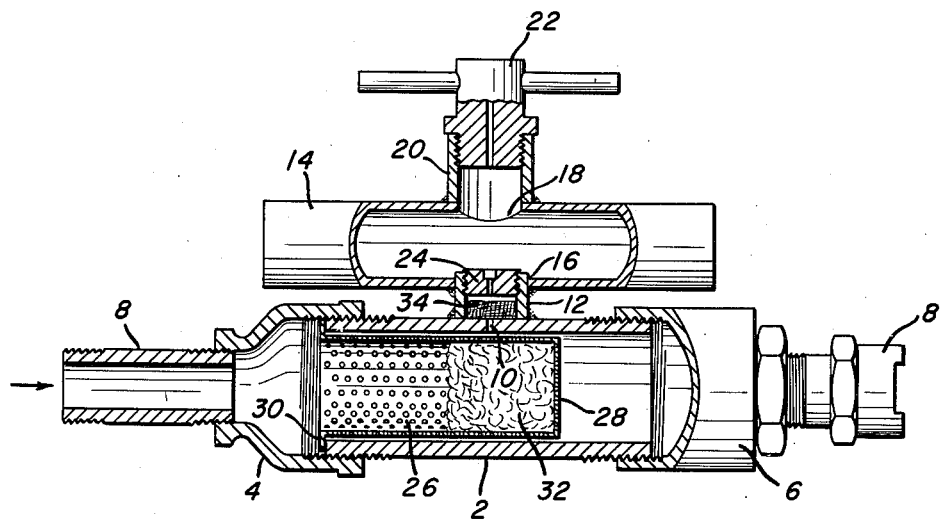
INVENTOR:
RAYMOND E. BOSS,
BY: Donald G. Dalton
his Attorney.

United States Patent Office 2,792,073
Patented May 14, 1957

2,792,073

AIR FILTER AND OILER FOR PNEUMATIC TOOLS

Raymond E. Boss, Clairton, Pa., assignor to United States Steel Corporation, a corporation of New Jersey Application April 19, 1955, Serial No. 502,401

2 Claims. (Cl. 183—8)

The present invention relates to a combined air filter and lubricator especially suitable for use with pneumatic tools.

Portable pneumatic tools, such as chipping hammers, concrete busters, etc., are utilized to a considerable extent throughout modern industrial plants in construction and maintenance work. The air required for the operation of these tools is usually supplied from a central air compressor station by means of a network of piping which carries the compressed air to numerous outlets located at various points throughout the plant. The portable air tools are connected to the air outlets by means of flexible hoses with suitable connections. Rust and foreign matter frequently accumulate in the air supply piping, especially the sections which are idle over long periods of time, and as a result, the tools are sometimes damaged from the carryover of particles of rust and foreign matter. Also, proper operation of these tools requires that they be constantly lubricated in order to maintain them in efficient operating condition. For various reasons proper lubrication is sometimes neglected so that damage to the moving parts occurs. The invention I propose eliminates or minimizes the possibility of damage from the sources just described by filtering the air and imparting a lubricant thereto before it enters the pneumatic tool.

It is, accordingly, an object of my invention to provide a combined air filter and lubricator device which can be easily installed in an air line and which will simultaneously filter and impart lubricant to air passing through the line by causing it to flow through an oil-bearing filtering medium.

This and other objects will become more apparent after referring to the following specification and attached drawing.

In the drawing affixed to this specification and forming part thereof, a preferred embodiment of my invention is illustrated in a side elevational view partly in longitudinal section.

Referring more particularly to the drawing, reference numeral 2 designates the main body or housing of the device of the invention. The main body is in the form of an open end cylinder threaded at its ends to accommodate an inlet reducer 4 at one end and an outlet reducer 6 on the other end by which the main body is connected in a compressed air supply line 8. The main body 2 is provided with a transverse opening 10 through the wall thereof which serves as a lubricating inlet and communicates with a pipe or tube 12 which is attached to and projects normally from the main body 2 to a connection with an elongated, cylindrical oil reservoir 14. The oil reservoir 14 has closed ends and extends parallel with the main body 2. Oil reservoir 14 is provided with an oil outlet 16 intermediate its ends which communicates with the pipe 12. An oil inlet 18 having an internally threaded tubular projection 20 extending therefrom is provided in the wall of the reservoir 14 opposite the opening 16. A vented cap 22 is threaded into the tubular projection 20 for sealing the reservoir. The upper portion of the pipe 12 is internally threaded so as to receive a threaded and bored plug 24.

A perforated retaining sleeve 26 having a closed perforated end 28 and a flanged open end 30 is fitted in the main body 2 with closed end 28 toward the outlet end of the body 2. The diameter of the flanged open end 30 is less than the outside diameter of the main body 2 but greater than the inside diameter thereof so that, in position, the flange around the end 30 abuts the inlet end of the body 2 and thereby prevents longitudinal displacement of the sleeve in the direction of air flow. A filtering medium 32, which may be made of suitable fibrous material such as horse hair, glass wool, etc., is contained in the retaining sleeve 26 and serves to remove foreign matter from the air passing through the body 2.

A permeable fibrous material 34, such as a lamp wick or the like, is contained in the pipe 12 between the plug 24 and the main body oil inlet 10 for the purpose of retarding the flow of oil from the reservoir into the main body 2. In other words the lamp wick functions as an oil dispenser causing the oil to pass into the main body 2, drop by drop.

In operation, as the compressed air passes through the main body 2 in the direction indicated by the arrow the foreign matter such as rust or dirt is filtered out and the air picks up fine particles of oil from the oil-soaked filtering medium 32. The oil is thus carried to the moving parts of the pneumatic tool (not shown) to which the supply line 8 is connected. Thus, the combined air filter and lubricator of my invention minimizes the possibility of damage to the moving parts of the pneumatic tool by simultaneously removing foreign matter from the compressed air supply and imparting lubricant thereto to be carried to the tool constantly as it operates.

Although I have shown the device of my invention as being used in a horizontal position it will be understood that it functions as effectively where used in a vertical position. The shape of the oil reservoir 14 makes it effective regardless of the position of the device when in service. The flow of air through the main body 2 provides sufficient suction to draw the oil from the reservoir 14.

While one embodiment of my invention has been shown and described, it will be apparent that other adaptations and modifications may be made without departing from the scope of the following claims.

I claim:

1. In an air supply line for a pneumatic tool the improvement therewith of a combined air filtering and tool lubricating device, said device comprising an elongated housing having inlet and outlet ends disposed in said air supply line and adapted to have air pass therethrough, said housing having a transverse opening through the wall thereof intermediate its ends, a perforated retaining sleeve having a closed perforated end in said housing in proximity to said transverse opening with said closed end disposed toward the outlet end of said housing, a fibrous air filtering material contained in said sleeve, a closed end liquid lubricant reservoir tube disposed adjacent to and parallel with said housing, said reservoir tube having an outlet intermediate its ends opposite the transverse opening in said housing wall, a pipe attached to and extending between said reservoir and said housing with one end communicating with the outlet in said reservoir and its other end communicating with said transverse opening, a plug having a center hole therethrough threaded into the end of said pipe adjacent said reservoir outlet, liquid permeable material contained in said pipe between said plug and said transverse opening for retarding the flow of lubricant from said reservoir into said housing, said reservoir tube having an inlet intermediate its ends, and a cap threaded into said inlet.

2. In an air supply line for a pneumatic tool the improvement therewith of a combined air filtering and tool lubricating device, said device comprising an elongated housing having inlet and outlet ends disposed in said air supply line and adapted to have air pass therethrough, said housing having a transverse opening through the wall thereof intermediate its ends constituting a lubricant inlet, a perforated retaining sleeve having a closed perforated end in said housing disposed in proximity to said lubricant inlet with said closed end directed toward the outlet end of said housing, fibrous air filtering material contained in said sleeve, a liquid lubricant reservoir laterally adjacent said housing, said reservoir having an outlet but otherwise being closed, a tube connection between the outlet of said reservoir and said lubricant inlet for conducting liquid lubricant from said reservoir to said housing, a plug having an axial hole therethrough disposed in said tube connection adjacent said reservoir, a mass of liquid permeable material in said tube connection between said plug and said lubricant inlet for retarding the flow of lubricant into said housing.

References Cited in the file of this patent

UNITED STATES PATENTS

| 450,091 | Woolley | Apr. 7, 1891 |
| 1,113,342 | Hills | Oct. 13, 1914 |

FOREIGN PATENTS

| 358,609 | Great Britain | Oct. 15, 1931 |
| 374,095 | Great Britain | May 24, 1932 |
| 424,387 | Germany | Jan. 25, 1926 |